Patented Feb. 22, 1944

2,342,162

UNITED STATES PATENT OFFICE 2,342,162

EXTRACTION OF FOOD AND SIMILAR ANTI-OXYGENS FROM CANE AND BEET MOLASSES

Sidney Musher, New York, N. Y.

No Drawing. Application May 13, 1940,
Serial No. 334,900

8 Claims. (Cl. 252—398)

The present invention is particularly directed to the production of an antioxygenic material extracted from cane and beet molasses, having a preferred application to the stabilization of food products and also to the preservation of aqueous or non-aqueous compositions containing glyceride and other oils subject to oxidative deterioration.

It is among the objects of the present invention to provide enhanced antioxygenic materials from cane and beet molasses and particularly from black-strap molasses derived from the sugar cane. These materials may be widely used for inter-mixture with or for addition to various types of glyceride and other oils subject to oxidative deterioration, as well as to protein containing materials and which will be effective in stabilizing such products against oxidative deterioration, the development of rancidity and protein decomposition over long periods of time.

Another object of the present invention is to provide an improved method and procedure for enhancing the stability of food products and particularly food products containing minor amounts of glyceride or essential oils in aqueous dispersion.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has been found that the sugar cane and sugar beet molasses contain in their natural condition large quantities of materials which are highly effective as antioxygens for glyceride oil compositions and foods, to which the present invention will be particularly directed, but that in the natural sugar cane or beet, such antioxygens are not present in their most effective condition by reason of the presence of large quantities of water soluble carbohydrate materials.

It is therefore among the further objects of the present invention to provide procedures for obtaining these antioxygenic materials from molasses which will permit the concentration of the antioxygenic substances at relatively low cost and with removal of the sugar carbohydrate materials in large part and which at the same time will not materially decrease the sugar yield. These procedures result in the production of antioxygenic materials of high efficiency and effectiveness at substantially no added cost.

It has been found that the antioxygenic activity is most closely tied up with the non-sugar constituents of the molasses which, however, are most effective as antioxygens when combined with certain proportions of water soluble carbohydrates such as sucrose, glucose or fructose, but which proportion should be less than that obtained in the original aqueous extracted or expressed liquid or even in the molasses.

Among the non-sugar solids present are the various mineral or ash components together with the various organic nitrogen compounds such as proteins, nucleins, proteoses, nitrogenous bases such as guanine, amides such as asparagine, glutamine, etc., and the amino acids. Less important than these nitrogenous compounds are the various prosphorous compounds and organic acids, particularly the carboxy acids such as lactic, saccharinic, glycinic and various caramelized acids.

These mixtures and combinations of non-sugar materials show a very enhanced antioxygenic effect and their use in combination is important in order to obtain the fully desirable results of the present invention.

Moreover, these mixtures appear to be quite effective when the non-sugar solids are combined with from 1 to 10 times their weight of water soluble carbohydrates in the form of sucrose, glucose, fructose or combinations thereof.

In order to obtain and concentrate these antioxygenic substances, the original liquor, whether it be a directly expressed juice of the cane or beet or a diffused liquor containing from 10% to 20% of water soluble carbohydrates and preferably from 12% to 18% of sucrose, is first neutralized to a very slight alkalinity. This neutralization is desired since it is preferable to maintain the sucrose, which is a most valuable by-product, as high as possible and at the same time avoid the formation of too great a quantity of invert sugar which would tend to make it more difficult to remove large quantities of the water soluble carbohydrates present. This is accomplished by crystallization procedures upon evaporation under vacuum.

Although lime or calcium oxide is preferred as a neutralizing agent, this will often remove some of the organic acids and even albuminoids which it may be desired to retain in the final product. In such a case an alkali such as caustic soda or potash or even sodium or potassium carbonate or bicarbonate or sodium or potassium salts of relatively weak organic acids such as citric acid or tartaric acid may less preferably be employed.

To remove any excess alkalinity, it is possible to add carbon dioxide which may be bubbled through the liquor which will have the effect of precipitating any free lime which may be present. If desired, there may also be added a small amount of sulphur dioxide which will act both as a slight acidifying agent and to reduce any oxidized compounds which may be present.

The final product then is desirably evaporated, preferably under reduced pressure, and desirably at a temperature not exceeding 50° C. to remove the major portion of the sugar therefrom and this process is preferably continued until there is obtained a mother liquor in which the amount of water present will have been reduced to between 10% and 30% and preferably to 20% and the amount of carbohydrate will have been reduced to between 50% and 70% of such final liquor and preferably to about 60%.

The preferred molasses which is obtained, containing about 20% of water and about 60% of sugar, which may be equally divided between sucrose and invert sugar, will have a greater increased proportion of non-sugar solids, which may range from 10% to 40% with a preferred optimum of 25%.

Although this molasses contains antioxygens in much greater concentration than the original expressed or extracted aqueous liquor, nevertheless there is still too high a proportion of sugar to serve as a most desirable antioxygenic material and it is preferred to remove additional quantities of sugar which cannot readily be done by further vacuum evaporation and crystallization.

The additional quantities of sugar may then be removed by precipitating or dialyzing out a portion, and preferably a large proportion, of the sugar.

The sugar may also be removed by fermentation to convert the sugar into alcohol and other products which may readily be removed but this procedure is not most desirable in that it appears to reduce the activity of the remaining antioxygenic components included in the non-sugar solids dispersed or dissolved in the molasses. Generally, therefore, it has been found most desirable to reduce the sugar content by precipitation of the sugar in large part.

Since the latter procedure frequently involves the use of relatively large quantities of organic solvents followed by filtration, it has been found more satisfactory for many purposes to mix the molasses with the organic solvents tending to be more or less water miscible, such as the mono, di or tri hydroxy alkanes or aranes, or their ethers or esters. Among these solvents are included particularly ethyl alcohol, methyl alcohol, propyl alcohol, butyl alcohol and amyl alcohol. Less preferably there may be employed acetone, diacetone alcohol, furfural, ethyl acetate, amyl acetate, ethylene glycol, propylene glycol, glycol esters or ethers or mixtures thereof.

These solvents may be mixed with the molasses containing, for example, from 50% to 70% carbohydrates, about 10% to 30% of water and the balance non-sugar solids, to produce an extract or residue primarily of the non-sugar solids with a minor proportion or a relatively smaller proportion of sugar than is present in the molasses.

For example, the ethyl alcoholic extract of blackstrap molasses will remove as much as about 20% of alcohol soluble matter as an antioxidant concentrate and which extract may be subjected to further extraction where desired.

Preferably when such an extraction is made it should be made at room temperature and with mild agitation. If desired, temperatures up to 150° F. and sometimes up to 200° F. with or without pressure and agitation may also be employed during extraction. In any case, however, the heating should be carried out under such conditions that the molasses does not substantially become homogenized or emulsified with the extracting solvent and so that the extracting solvent is not substantially lost by evaporation.

Less preferably, non water miscible solvents may be employed, such as benzol, toluol, xylol, benzine, kerosene, hexane, etc.

The solutions in these various organic solvents may then be treated to recover the organic solvent to produce the concentrated antioxygens which in the course of being evaporated to dryness may be caused to be absorbed upon or evaporated on to various types of carriers, such as to starch, salt, sugar, cereal flours, powdered milk, or even inorganic carriers such as kieselguhr, bone char, etc.

This concentrated extract may be used directly for surfacing meat or fish or other oxidizable organic composition to prevent oxidation thereof or it may be mixed with glyceride, essential or hydrocarbon oils or compositions containing the same in small amounts varying from 0.01% to 5% to prevent oxidative deterioration thereof.

Where the sugar is precipitated away from the molasses to increase the concentration of non-sugar solids left in the residual liquor, as by addition of an organic solvent which is not a solvent for sugar, the resultant mixture, after removal of the precipitate, may also be evaporated down to recover the solvent and the antioxygenic values therein and the drying may be aided by depositing the material in the latter stage of evaporation on various carriers as above mentioned.

Where the molasses is dialyzed to remove a major proportion of the sugars, the non-sugar portion may, where desired, be concentrated by boiling at atmospheric or under reduced pressure and the concentrated extract thus utilized.

In the less preferably fermentation procedures where the sugar has been largely broken down by fermentation, the residue which is obtained after removal of the volatile degradation products of the sugar may be evaporated to dryness with or without the addition of carriers as above mentioned and the resultant mixture may then be used with or without evaporation to dryness and with or without the deposition upon carriers as antioxidants.

In all of the above cases, the initial extracted material may be evaporated to dryness and a further extraction may be made preferably with one of the organic solvents above mentioned or less preferably with water or with a mixture of water and the various miscible organic solvents above mentioned.

As another method of concentrating the antioxygenic values of the above identified aqueous extracts or expresses of the sugar cane or beet, it has been found possible to pass the initial liquor which is expressed or extracted from the sugar beet or sugar cane through an absorption material such as, for example, through silica gel, bone char, charcoal, or other absorbent which will have the effect of removing many of the non-sugar solids therein.

This same procedure also may be carried out with the molasses above referred to or with the various organic solvent solutions or extracts above referred to. Thus kieselguhr, bone char, charcoal, silica gel or other material carrying these absorbed non-sugar solids may be dried or heated at a high temperature of the order of 250° F. to 400° F. or directly broken down into a powder and then added to the various organic compositions susceptible to oxidative deterioration to retard such deterioration.

If desired, however, these various materials such as bone char, charcoal, silica gel, kieselguhr, or other absorbing materials carrying the absorption products from the original aqueous extract or express of sugar cane or sugar beet or from the molasses or extracts or concentrates of molasses, with or without drying or heating to 250° F. to 400° F., may be subjected in turn to extraction with water or with ethyl alcohol, methyl alcohol, butyl alcohol, acetone, methyl, ethyl, butyl, propyl or amyl esters and fatty acids having from 2 to 10 carbon atoms or mixture thereof to remove some or all of the antioxygenic values absorbed thereon, followed by removal of the organic solvent or other solvent with or without absorption or deposition of the solids upon various carriers as above mentioned.

Among the materials to which the present invention may be applied are blackstrap molasses, refinery molasses, sorghum molasses, cane molasses, and beet molasses which may be treated as such, according to the various precipitation, extraction, dialyzing and other concentration procedures above described, according to which the amount of non-sugar solids is so increased that the amount of the non-sugar solids will be at least 20% of the sugar solids present in the final solids obtained and sometimes up to as much as 100% of the sugar solids.

This proportion of the sugar with respect to the non-sugar solids has been found to be quite important in obtaining a most desirable antioxygenic material and the value of such various antioxygenic materials may be enhanced by charring of the same or by heating to a temperature at which the sugar either caramelizes or chars as the case may be as, for example, from 250° F. to 400° F., particularly after addition to the oxidizable organic composition.

Although the molasses is treated preferably in liquid form, it also may first be evaporated to dryness and then extracted or taken up in the various solvents to give the desired results of the present invention.

These extracts or concentrates of non-sugar solids contained in molasses with or without carriers as above suggested and with or without further extraction with water or organic solvents, may be added in relatively small amounts varying from 0.05% to 10% and preferably between 0.1% and 5% to various oxidizable organic compositions.

Among the organic materials that may be stabilized in accordance with the present invention are included the glyceride oils of animal or vegetable origin, such as cottonseed, corn, sesame, peanut, tea seed, olive, cod liver, castor, lard, oleo oil and tallow, whether in their crude, refined or hydrogenated condition.

Among the glyceride oil containing compositions which may be stabilized by the addition thereto of the molasses extracts prepared in accordance with the present invention, are included dairy products such as milk, cream, cream cheese, sour cream and cream to be used in the manufacture of butter. For example, the extract may be added to cream, preferably before the cream subjected to a temperature of about 160° F. and the cream may then be churned to produce butte and although the butter is substantially free of the added extract, the butter is nevertheless stabilized against oxidative deterioration.

Moreover, these extracts may be applied to meat and fishery products and may be used for example for addition to the rendering kettles in the rendering of lard, oleo oil, tallow, fish and fish liver oils, etc., and particularly under the conditions of the elevated temperature treatment in excess of about 210° F. in the rendering kettle these extracts become enhanced in antioxygenic activity.

The molasses extract may also be utilized in the treatment of paper and paperboard where they may be applied particularly as a surface sizing thereon by inclusion in the sizing baths which may also contain rosin, rosin wax sizes, casein, or other high molecular weight fatty alcohols. Pine stock board may particularly be treated by the use of these molasses extracts.

In the textile industry, and particularly where textiles and fabrics are treated with glyceride oils, soaps or sulfonated oils, the molasses extracts may be applied either to the oils prior to application to the textile or may be included in the sizing baths during the treatment of the textiles.

Similarly, these extracts may be utilized in the manufacture of soaps and particularly where the soap is made of an unsaturated glyceride oil base or where it contains essential oils readily subject to oxidative deterioration.

Among other organic materials that may similarly be stabilized are included the essential o. and essential oil containing compositions such as the perfumes, lemon oil, orange oil, orange juice, lemon juice, gelatin desserts and other food products containing oxidizable essential oils.

These concentrates may also be employed in the stabilization of the high molecular weight hydrocarbons such as rubber and lubricating oils and they appear not only to have oxidation inhibiting properties but also reduce sludge formation, metallic corrosion and other reactions which are due in part or entirely to oxidation.

Where the molasses concentrates are added to these organic compositions, they are used in an amount between about 0.05% and 10% dependent upon the nature of the oxidizable composition and its susceptibility to oxidation.

Preferably, the extracts are thoroughly mixed in with the oxidizable composition so as to form a part of their total mass, although these extracts may also be applied as a surface coating or sprayed on to such composition.

It has also been found possible for these extracts to be applied in a minor proportion of under 5% and preferably under 2% to salt, sugar or other carriers before addition to the oxidizable composition. For example, 0.25% of the ethyl alcoholic extract of refinery blackstrap molasses may be applied to refined crystallized cane sugar and the sugar carrying the extract utilized for addition to organic oxidizable compositions.

As a preferable procedure, the extract may be applied to salt, the application being made preferably while the salt is at an elevated temperature of over 220° F. The salt carrying a small proportion, under 5% of the extract may be employed in the curing of meat such as bacon or hams, fish such as mackerel, sardines or salmon, or in the curing of leather in order to retard oxidative deterioration and protein decomposition.

These various extracts may also be sulfated, borated or phosphated in order to form emulsifying agents, wetting agents or dispersing agents and they may also be used as finishing materials in the finishing of textiles and fabrics.

These extracts are of particular importance when mixed with amounts varying from 25% to 300% of certain other materials, preferably oxidation inhibitors such as (a) phosphorous compounds particularly of the nature of lecithin or other phospholipins, cephalin, phosphatides, phosphoric acid, phosphates, other inorganic and organic phosphorous compounds, etc., or products which include these materials, (b) polycarboxylic aliphatic and other acids such as tartaric, citric, maleic, malic, succinic, fumaric, pyruvic, etc., (c) nitrogen containing organic compounds such as the proteins like albumen, casein, etc., amino acids, aminophenols, such as monobenzyl-p-aminophenol, naphthylamines, their derivatives, aniline derivatives, aromatic amines, hydroxylamine, etc., (d) the sulfur compounds such as sulphuric acid and its salts, sulphur containing proteins, other organic and inorganic sulfur compounds, etc., (e) carotenoid pigments such as carotene, and (f) aromatic compounds such as polyhydroxybenzenes including hydroquinone, pyrogallol, pyrocatechol, and other polyhydroxyphenols, guaiacol, eugenol, thymol, and similar materials, the naphthols including alphanaphthol and substituted naphthols, aromatic hydroxy-aldehydes, etc.

These combinations of the molasses extracts and the oxidation inhibitors referred to above are particularly potent sources of antioxygenic activity when applied to organic materials and particularly to organic oils such as to glyceride, essential, hydrocarbon or lubricating oils and then subjected to an elevated temperature treatment in excess of about 250° F. whereupon in combination they show extremely effective antioxygenic activity.

It has furthermore been found that where the molasses and particularly blackstrap molasses, is subjected to an elevated temperature treatment in excess of about 200° F. and preferably to over 210° F., at a pH between about 4 and 6.9 and for a period of from several minutes to 1 hour or more, an enhanced antioxygenic effect is obtained. The extracts which are removed from the molasses prepared in this manner may more readily be utilized for addition to oxidizable oils and oxidizable organic oil containing compositions in order to stabilize them against oxidative deterioration. For example, blackstrap molasses may be heated to 210° F. for 1 hour at pH 5, the pH adjustment being made by the addition of any suitable organic or inorganic acid, and the molasses following treatment may, with or without neutralizing to normal pH, be extracted in accordance with the present invention in order to remove potent antioxygenic materials capable of retarding oxidative deterioration of organic products subject thereto in accordance with the present invention.

The present application is a continuation in part of applications, Serial No. 330,985, filed April 22, 1940, and Serial No. 331,179, filed April 23, 1940, and through said applications continues in part the subject matter of applications, Serial No. 292,613, filed August 30, 1939, now Patent No. 2,198,208, and Serial No. 260,898, filed March 10, 1939, now Patent No. 2,198,211, which patents in turn continue in part the subject matter of application, Serial No. 257,099, filed February 18, 1939, now Patent No. 2,176,033.

Having described my invention, what I claim is:

1. A method of retarding oxidative deterioration of food compositions, which comprises adding thereto a small amount of an alcohol soluble extract of molasses, said extract containing a smaller proportion of sugar to non-sugar solids than said molasses.

2. A method of retarding oxidative deterioration of food compositions, which comprises adding thereto a small amount of a water miscible organic solvent extract of molasses, said extract containing a smaller proportion of sugar to non-sugar solids than said molasses.

3. A method of preparing antioxygenic compositions suitable for addition to food products subject to oxidative deterioration, which comprises mixing blackstrap molasses with a water miscible organic solvent, which solvent is not fully miscible with the blackstrap molasses, separating the solvent soluble extract, evaporating the solvent, and then mixing the extract with the products subject to oxidative deterioration.

4. A method of preparing antioxygenic compositions suitable for addition to food products subject to oxidative deterioration, which comprises mixing blackstrap molasses with an alkanol, which alkanol is not fully miscible with the blackstrap molasses, separating the alkanol soluble extract, evaporating the alkanol, and then mixing the extract with the products subject to oxidative deterioration.

5. A method of preparing antioxygenic compositions suitable for addition to food products subject to oxidative deterioration, which comprises mixing blackstrap molasses with methanol, which methanol is not fully miscible with the blackstrap molasses, separating the methanol soluble extract, evaporating the methanol, and then mixing the extract with the products subject to oxidative deterioration.

6. As an antioxygenic material suitable for addition to food compositions subject to oxidative deterioration, an alcohol soluble extract of molasses, said extract containing a smaller proportion of sugar to non-sugar solids than molasses.

7. As an antioxygenic material suitable for addition to food compositions subject to oxidative deterioration, a water miscible organic solvent extract of molasses, said extract containing a smaller proportion of sugar to non-sugar solids than molasses.

8. As an antioxygenic material suitable for addition to food compositions subject to oxidative deterioration, a methanol soluble extract of molasses, said extract containing a smaller proportion of sugar to non-sugar solids than molasses.

SIDNEY MUSHER.